(12) United States Patent
Lin et al.

(10) Patent No.: US 12,479,664 B2
(45) Date of Patent: Nov. 25, 2025

(54) AUTOMATED UNIT LOAD FULFILLMENT METHODS AND SYSTEMS

(71) Applicant: FETCH ROBOTICS, INC., San Jose, CA (US)

(72) Inventors: David Lin, San Jose, CA (US); David Dymesich, New York, NY (US); Uwe Meister, El Dorado, CA (US); Mason Cole, Lambertville, MI (US); Lonai Anthraper, San Jose, CA (US); Sarah Elliott, San Jose, CA (US); Louis Abastas, San Jose, CA (US); Robert Lang, San Jose, CA (US); Melonee Wise, San Jose, CA (US); Stefan Nusser, Palo Alto, CA (US); David Robson, San Jose, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 737 days.

(21) Appl. No.: 17/590,666

(22) Filed: Feb. 1, 2022

(65) Prior Publication Data

US 2022/0242667 A1   Aug. 4, 2022

Related U.S. Application Data

(60) Provisional application No. 63/144,913, filed on Feb. 2, 2021.

(51) Int. Cl.
*B65G 1/137* (2006.01)

(52) U.S. Cl.
CPC .... *B65G 1/1373* (2013.01); *B65G 2201/0267* (2013.01); *B65G 2203/0233* (2013.01); *B65G 2203/0283* (2013.01)

(58) Field of Classification Search
None
See application file for complete search history.

(56) References Cited

U.S. PATENT DOCUMENTS 8,306,650 B1   11/2012   Antony et al.
9,559,461 B1    1/2017   Diehr
(Continued)

FOREIGN PATENT DOCUMENTS

| CA | 3050740 A1 * | 8/2018 | ............... B65G 1/10 |
| GB | 2433630 A | 6/2007 | |
| WO | WO-2019117844 A1 * | 6/2019 | ............ B25J 13/088 |

OTHER PUBLICATIONS

International Search Report and Written Opinion for application No. PCT/US2022/014773 mailed on Apr. 5, 2022.
(Continued)

*Primary Examiner* — Jason Holloway
*Assistant Examiner* — Bryant Tang (57) ABSTRACT

A method includes: obtaining a task definition for a mobile robot, the task definition including (i) a position on an item support carried by the mobile robot, and (ii) an identifier of an item to be placed at the position to form a unit load with the item support; controlling the mobile robot carrying the item support to travel to a pick location for receiving the item from a picker; controlling an output device to render an indication of the position for the picker at the pick location; responsive to placement of the item at the position by the picker, controlling the mobile robot to travel to a handling location.

24 Claims, 8 Drawing Sheets

(56) References Cited

U.S. PATENT DOCUMENTS

| | | |
|---|---|---|
| 9,701,012 B1 | 7/2017 | Theobald |
| 10,482,401 B2 | 11/2019 | Wurman et al. |
| 2012/0154124 A1 | 6/2012 | McDonald |
| 2012/0173449 A1 | 7/2012 | Waddington et al. |
| 2014/0350725 A1 | 11/2014 | LaFary et al. |
| 2015/0360865 A1* | 12/2015 | Massey .................. B25J 11/008 414/275 |
| 2020/0172339 A1 | 6/2020 | Theobald |

OTHER PUBLICATIONS

DE Koster. "Automated and Robotic Warehouses: Developments and Research Opportunities, Logistics and Transport No. 2 (38)/ 2018." DOI 10 (2015): 83-1734. Jan. 1, 2018 Retrieved on Mar. 22, 2022 from https://repub.eur.nl.pub/112376/4_Rene_BM_de_Koster.pdf.

Nia et al. "Dual command cycle dynamic sequencing method to consider GHG efficiency in unit-load multiple-rack automated storage and retrieval systems" Computers & Industrial Engineering 111 (2017): 89-108. Jul. 11, 2017. Retrieved on Mar. 22, 2022 from <https://www.sciencedirect.com/science/article/abs/pii/S0360835217302978>.

Germany Office Action dated Aug. 29, 2024 for German patent application No. 112022000929.2.

\* cited by examiner

AUTOMATED UNIT LOAD FULFILLMENT METHODS AND SYSTEMS

CROSS-REFERENCE TO RELATED APPLICATIONS

This application claims priority to U.S. Provisional Patent Application No. 63/144,913, filed Feb. 2, 2021, the entire contents of which is incorporated herein by reference.

BACKGROUND

Item handling facilities (e.g. warehouses, shipping facilities and the like) may deploy systems that include various automated or partially automated devices to assist in the movement and handling of items, such as mechanized processing equipment, autonomous vehicles for transporting items, and the like. Certain item handling processes, however, have constraints that reduce the effectiveness of such systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method, comprising: obtaining a task definition for a mobile robot, the task definition including (i) a position on an item support carried by the mobile robot, and (ii) an identifier of an item to be placed at the position to form a unit load with the item support; controlling the mobile robot carrying the item support to travel to a pick location for receiving the item from a picker; controlling an output device to render an indication of the position for the picker at the pick location; responsive to placement of the item at the position by the picker, controlling the mobile robot to travel to a handling location.

Additional examples disclosed herein are directed to a system, comprising: a mobile robot having a platform for carrying an item support; and a task controller, configured to: obtain a task definition including (i) a position on an item support, (ii) an identifier of an item to be placed at the position to form a unit load with the item support, and (iii) an identifier of a unit load handling operation; control the mobile robot carrying the item support to travel to a pick location for receiving the item; control an output device associated with the pick location to render an indication of the position; responsive to placement of the item at the position, control the mobile robot to travel to a handling location associated with the unit load handling operation; and responsive to arrival of the mobile robot at the handling location, automatically position the mobile robot relative to an apparatus at the handling location.

Further examples disclosed herein are directed to a method, comprising: obtaining a task definition for a mobile robot having a sensor, the task definition including (i) an identifier of an item to be placed on an item support carried by the mobile robot, to form a unit load with the item support, and (ii) an identifier of a unit load handling operation to be applied to the unit load; responsive to placement of the identified item on the item support by a picker, controlling the mobile robot to travel to a handling location corresponding to the unit load handling operation; responsive to arrival of the mobile robot at the handling location, capturing sensor data via the sensor of the mobile robot; and based on the sensor data and the identifier of the unit load handling operation, automatically positioning the mobile robot relative to an apparatus at the handling location.

Figure 1:
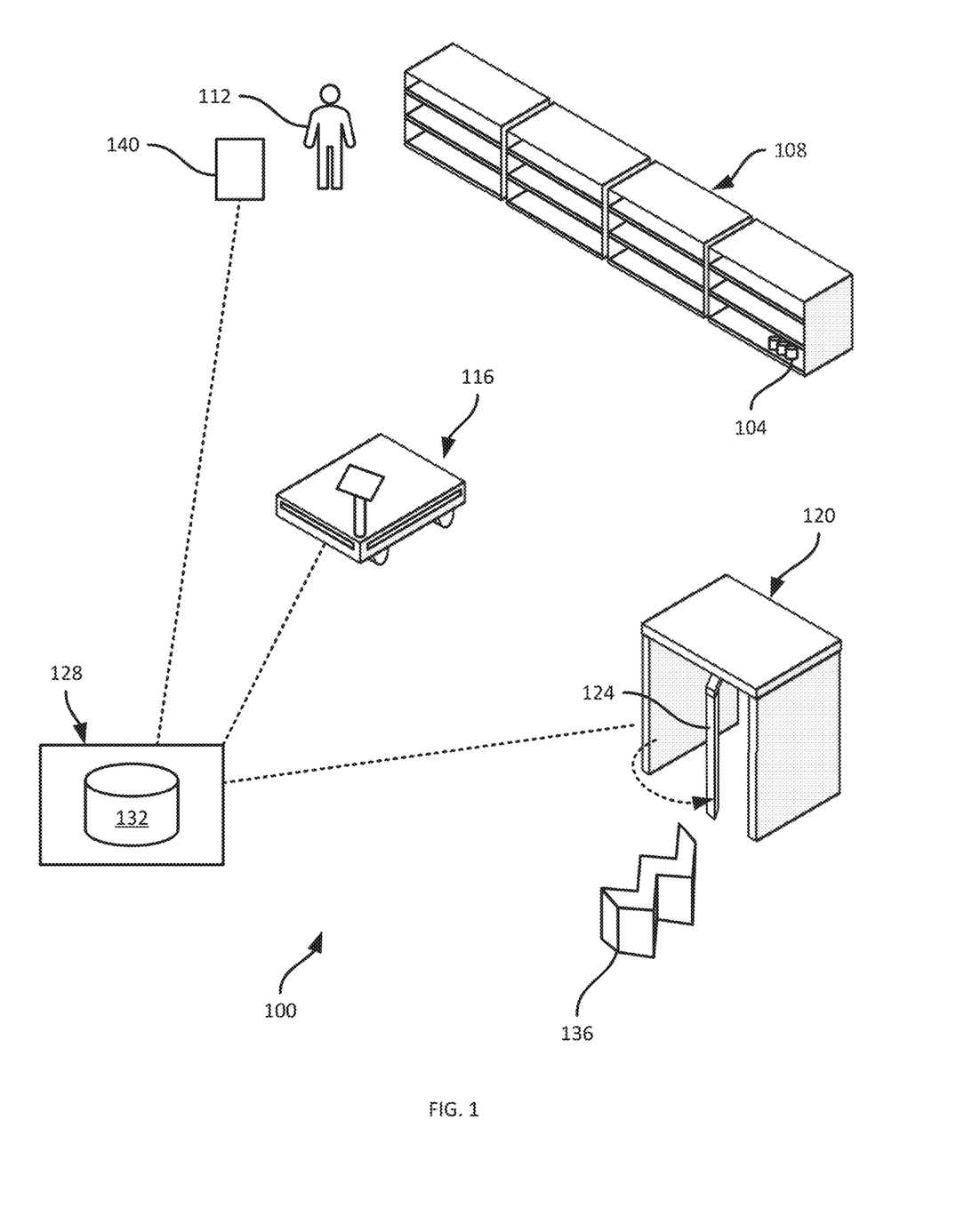
FIG. 1 is a diagram of an item handling facility containing a unit load fulfillment system.

FIG. 1 illustrates an item handling facility 100 or a portion thereof, such as a warehouse or other transport and logistics facility, a manufacturing facility, or the like. The nature of items handled in the facility 100 can vary widely. In some examples, the items can include packages containing products for transit to other facilities, customers (e.g., individuals having placed orders for the above-mentioned products) or the like. In other examples, the items can include products received from manufacturers or other entities, or manufactured and/or assembled at the facility 100 itself, to be shipped to distribution centers and/or retailers. The facility 100 can also handle combinations of the above items. Items 104 received and/or produced at the facility 100 can be stored before processing, e.g., for delivery to retailers as noted above. The items 104 can, for example, be stored on support structures 108 such as shelving modules, racks, or otherwise designated areas of the facility 100.

Processing the items 104 for delivery from the facility 100 as mentioned above therefore involves the retrieval of items 104 from the support structures 108, and transport of the retrieved items 104 to other areas of the facility 100, e.g. for packaging, loading onto vehicles for shipping, and the like. For example, an order received at the facility 100 can specify a set of items to be retrieved for shipping to a given destination (e.g., items previously ordered by a given customer). In some facilities, to fulfill of such an order, a worker retrieves a cart, pallet jack, or the like, and travels through the facility to collect the specified items. Such an arrangement, however, may involve extensive travel by the worker.

In other facilities, as illustrated in FIG. 1, workers 112 are allocated to particular areas of the facility 100. Although one worker 112 is shown in FIG. 1, it will be understood that a plurality of workers 112 can be deployed throughout the facility 100. Instead of traveling throughout the facility to complete an order, each worker 112 picks items from the specific area to which that worker 112 is assigned. Transport of items picked by one or more workers 112 is enabled by transporters, such as autonomous or semi-autonomous vehicles, also referred to as mobile robots 116. To fulfill an order, a mobile robot 116 is dispatched to travel to locations corresponding to the items specified in the order. At each location, a worker 112 assigned to that location picks the relevant item(s) to the mobile robot 116. Over time, therefore, the mobile robot 116 collects items corresponding to an order. When the complete set of items has been collected, the mobile robot 116 can be directed to a shipping area or other processing location of the facility 100.

While the use of mobile robots 116 reduces travel time by the workers 112, the completion of an order by various different workers can complicate the fulfillment of certain types of orders. In particular, some orders, referred to as unit load orders, specify not only a set of items to be retrieved for further processing, but also indicate that the set of items is to be aggregated into a unit load, which is then handled as a single item. Aggregation of one or more items into a unit load generally involves the placement of the item(s) on or in an item support, such as a pallet, a container, or the like.

The physical nature of the items in a unit load order (e.g., the size and/or weight of the items) may place constraints on the aggregation process. For instance, it may be necessary to place larger and/or heavier items directly on the item support, with smaller and/or lighter items placed on top of the larger/heavier items. However, in a system in which a mobile robot 116 travels throughout the facility 100 and various different workers 112 pick items to the mobile robot 116, each worker 112 may be unaware of the complete set of items in the order, and/or of the physical attributes of such items. Items may therefore be placed on the mobile robot at suboptimal positions, which may require rearrangement during retrieval of the items, or lead to an unstable unit load.

In addition, the fulfillment of a unit load order can involve one or more unit load handling operations. For example, the unit load may be wrapped (e.g., in plastic wrap or other suitable material) after collection of the items forming the unit load and prior to shipping. While wrapping can be performed manually, e.g., by a worker 112, in some implementations wrapping of unit loads can be performed by a mechanized apparatus, e.g., a wrapper 120 having a rotating arm 124 configured to dispense wrapping material and thereby wrap a unit load positioned within the wrapper 120. The wrapper 120 as illustrated in FIG. 1 is a static apparatus (e.g., non-mobile), however other handling apparatuses may be mobile within the facility 100.

More generally, handling operations including wrapping as mentioned above, and/or other operations, may be applied during the assembly of a unit load. For example, a further handling operation includes the retrieval of an item support (e.g., a pallet) on the mobile robot 116 before collection of items for the order begins. Such retrieval can be performed by positioning the mobile robot 116 relative to a mechanized pallet lifter, in order to receive the pallet. Further example handling operations include weighing of the unit load by placing the mobile robot 116 on a scale, scanning the unit load by placing the mobile robot 116 within the field of view of a scanning apparatus, and the like. As will be apparent, the above-mentioned handling operations, particularly when performed with the assistance of mechanized handling apparatuses such as the wrapper 120, may require accurate positioning of the mobile robot 116 (and therefore, the unit load carried by the mobile robot 116) relative to a handling apparatus.

The facility 100 therefore includes certain components and functionality to enable the fully or partially automated assembly of a unit load carried by a mobile robot 116. In particular, the above-mentioned components and functionality enable interactions between the mobile robot 116 and multiple workers (e.g., without a static pairing between any particular worker 112 and the mobile robot 116), as well as interactions between the mobile robot and handling apparatuses such as the wrapper 120.

In particular, a server 128 is deployed in association with the facility 100, e.g. physically located at the facility 100, or located remotely from the facility 100 (e.g. in a distributed computing system or the like) and communicatively linked with one or more computing devices at the facility 100. The server 128, in combination with the mobile robot 116 and/or apparatuses such as the wrapper 120, implements task control functionality to both provide item placement guidance (e.g., to workers 112) for the assembly of a unit load, and to guide interactions between the mobile robot 116 and the above-mentioned handling apparatuses for processing of the unit load.

The server 128 stores, or accesses via separate storage, a repository 132 containing various information used in implementing the functionality described herein. For example, the repository 132 can contain item identifiers and the locations of the items in the facility 100 (e.g., an identifier of which area, shelf module, or the like contains each item type). The repository 132 can also contain item attributes for each item type in the facility, such as dimensions, weights, and the like.

The repository 132 can further contain periodically updated locations of each mobile robot 116 in the facility 100 (e.g., reported by the mobile robots 116). Still further, the repository 132 can contain information defining various attributes of each unit load handling apparatus (such as the wrapper 120). Attributes can include network identifiers, locations within the facility corresponding to each apparatus, and alignment data that defines an orientation of the mobile robot 116 relative to the apparatus to enable interaction between the mobile robot 116 and the apparatus. The orientation defined by the alignment data can be relative to a physical feature of the apparatus, or associated with the apparatus, that is detectable by the mobile robot 116. An example of such a feature is shown in FIG. 1 as a marker 136 disposed adjacent to the wrapper 120. The marker 136 can be a two-dimensional or three-dimensional object placed on or near the wrapper 120, and is configured to be readily detectable by sensors of the mobile robot 116, as described below in greater detail.

As will be discussed below, the server 128 can obtain task definition data including a variety of information employed to control the mobile robot 116 and/or handling apparatuses to fulfill a unit load order. Portions of the task definition data can then be communicated to the mobile robot 116, the apparatuses, and/or client computing devices operated by the workers 112, such as a client device 140 shown in FIG. 1 (e.g., a mobile computer, a wearable computing device such as a heads-up display, or the like).

Figure 2:
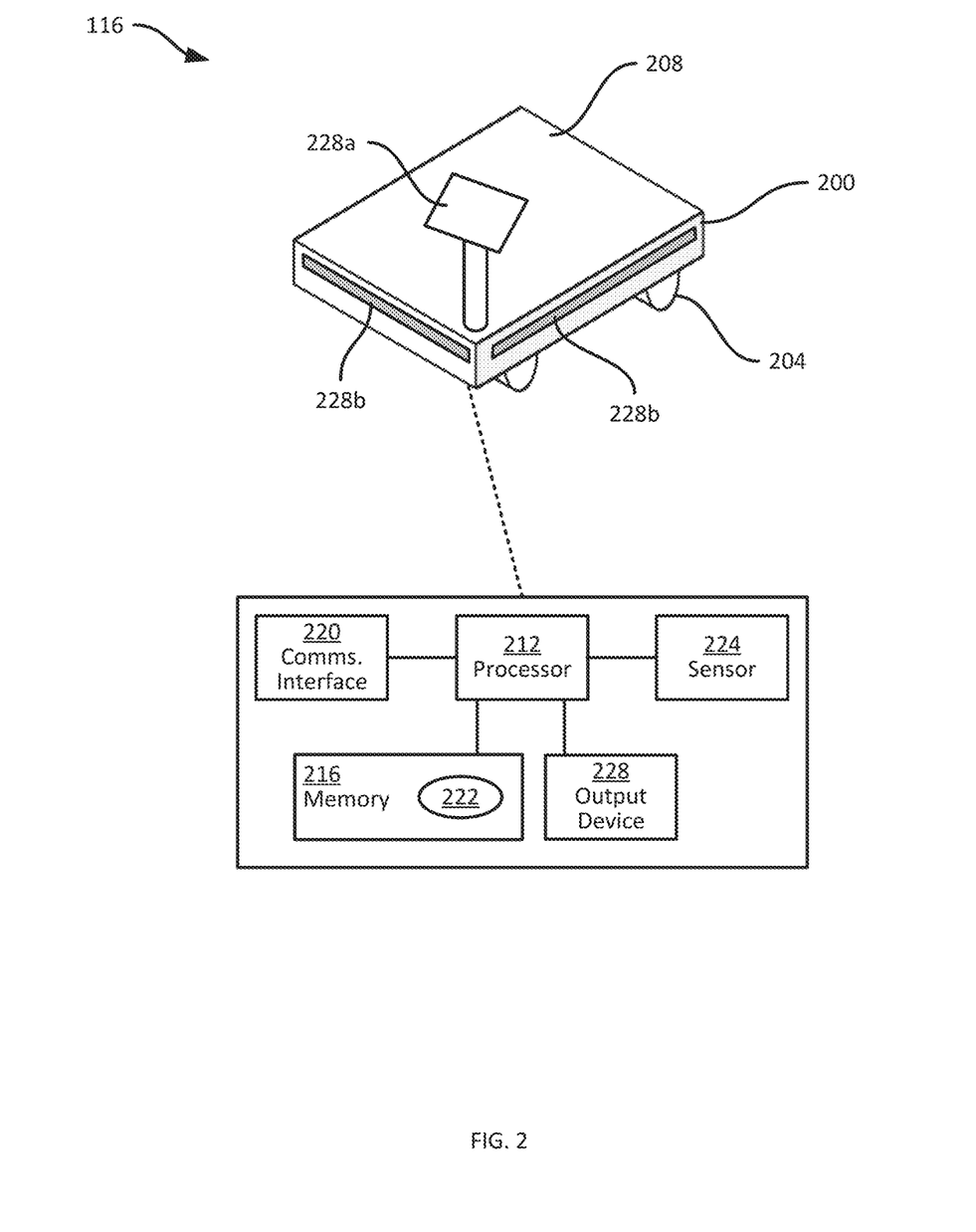
FIG. 2 is a diagram illustrating certain components of the mobile robot of FIG. 1.
Figure 3:
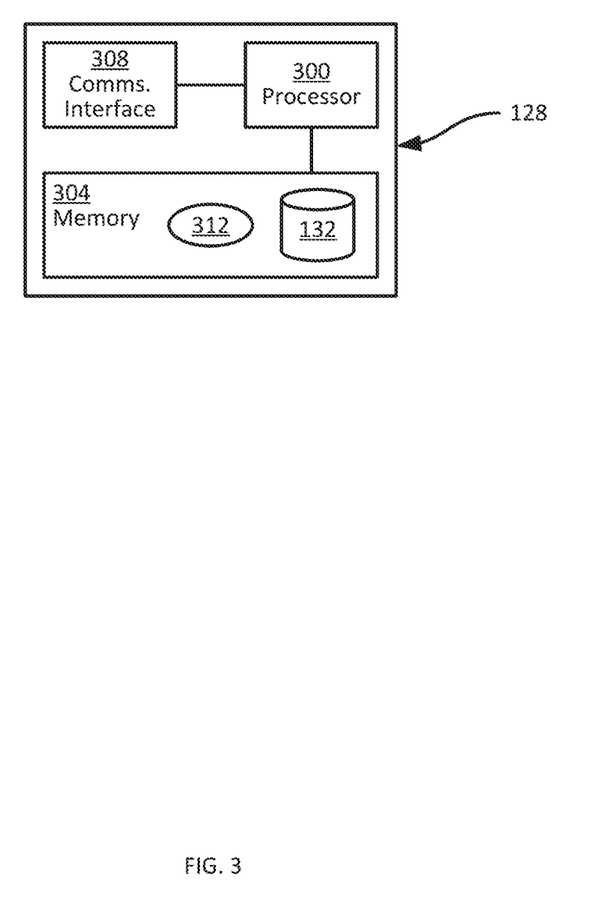
FIG. 3 is a diagram illustrating certain components of the server of FIG. 1.

Turning to FIG. 2 and FIG. 3, before discussing the operation of the system in greater detail, certain components of the mobile robot 116 and the server 128 will be discussed. As shown in FIG. 2, the mobile robot 116 includes a chassis 200 supporting various other components of the mobile robot 116. In particular, the chassis 200 supports a locomotive assembly 204, such as one or more electric motors or the like driving a set of wheels, tracks, or the like.

The mobile robot 116 also includes a platform 208 defined on an upper surface of the chassis 200. The platform 208 is configured to carry items 104 and/or item supports such as pallets (onto which the items 104 can then be placed). In some examples, the platform 208 is movable relative to the chassis 200. For instance, the platform 208 can be configured to rotate relative to the chassis 200 (e.g., to facilitate wrapping of a unit load on the platform, and/or to facilitate access by a worker 112 to various portions of the platform 208). In other examples, the platform 208 can be configured to translate vertically in addition to or instead of rotating, e.g., to maintain the uppermost extent of a partially-assembled unit load at an optimal height for item placement by workers 112.

The chassis 200 also contains a processor 212, e.g., in the form of one or more central processing units (CPU), graphics processing units (GPU), or dedicated hardware controllers such as application-specific integrated circuits (ASICs). The processor 212 is communicatively coupled with a memory 216, e.g., a suitable combination of volatile and non-volatile memory elements. The processor 212 is also coupled with a communications interface 220, such as a wireless transceiver enabling the mobile robot 116 to communicate with other computing devices, such as the server 128.

The memory 216 stores various data used for autonomous or semi-autonomous navigation, including an application 222 executable by the processor 212 to implement navigational functions, as well as task execution functions described in detail herein. In some examples, the above functions can be implemented via multiple distinct applications stored in the memory 216.

The chassis 200 also supports a sensor 224, such as one or more cameras, depth sensors (e.g., lidars, depth cameras, or the like) coupled with the processor 212. The sensor 224 is configured to capture image and/or depth data depicting at least a portion of the physical environment of the mobile robot 116, for processing (e.g., by the processor 212) to detect structures such as the marker 136 and other features of the facility 100. For example, the sensor 224 can be implemented as a set of depth cameras, e.g., a pair of cameras disposed at each corner of the platform 208, for a total of eight such cameras. A wide variety of other sensor hardware can also be implemented, in addition to or instead of the above-mentioned depth cameras. For example, the mobile robot 116 can include sensors configured to detect the items 104, such as load sensors integrated with the platform 208, radio frequency identification (RFID) scanners configured to detect tags affixed to items, barcode scanners, and the like.

The chassis 200 further supports an output device 228, configured to generate output perceptible by the workers 112, e.g. in the form of sound and/or images. For example, the output device 228 can include a display 228a supported on the platform 208. The output device 228 can also include, in addition to or instead of the display 228a, a set of indicator lights 228b such as strips of addressable light emitting diodes (LEDs) or other light emitters on at least one side of the chassis 200. In the illustrated example, each of the four sides of the chassis 200 include a strip of LEDs. Various other output devices are also contemplated, including speakers and the like. As will be discussed below in greater detail, the output device 228 can be controlled to provide item-placement guidance, e.g., to a worker 112, during fulfillment of a unit load order. In some examples, the display 228a, when present, can include an integrated touch screen or other input device (e.g., a microphone or the like).

Turning to FIG. 3, certain internal components of the server 128 are illustrated. The server 128, in particular, includes a processor 300, e.g., in the form of one or more central processing units (CPU), graphics processing units (GPU), or dedicated hardware controllers such as application-specific integrated circuits (ASICs). The processor 300 is communicatively coupled with a memory 304, e.g., a suitable combination of volatile and non-volatile memory elements. The processor 300 is also coupled with a communications interface 308, such as a network interface controller (NIC) enabling the server 128 to communicate with other computing devices, such as the mobile robot 116, client devices 140, and the like.

The memory 304 can store the repository 132 mentioned earlier, as well as a task control application 312 whose execution by the processor 300 configures the processor 300 to implement various functions related to the fulfillment of unit load orders within the facility 100. As noted above, in other examples, the repository 132 can be stored at a distinct computing device and accessed by the server 128, and/or divided into multiple separate repositories.

Figure 4:
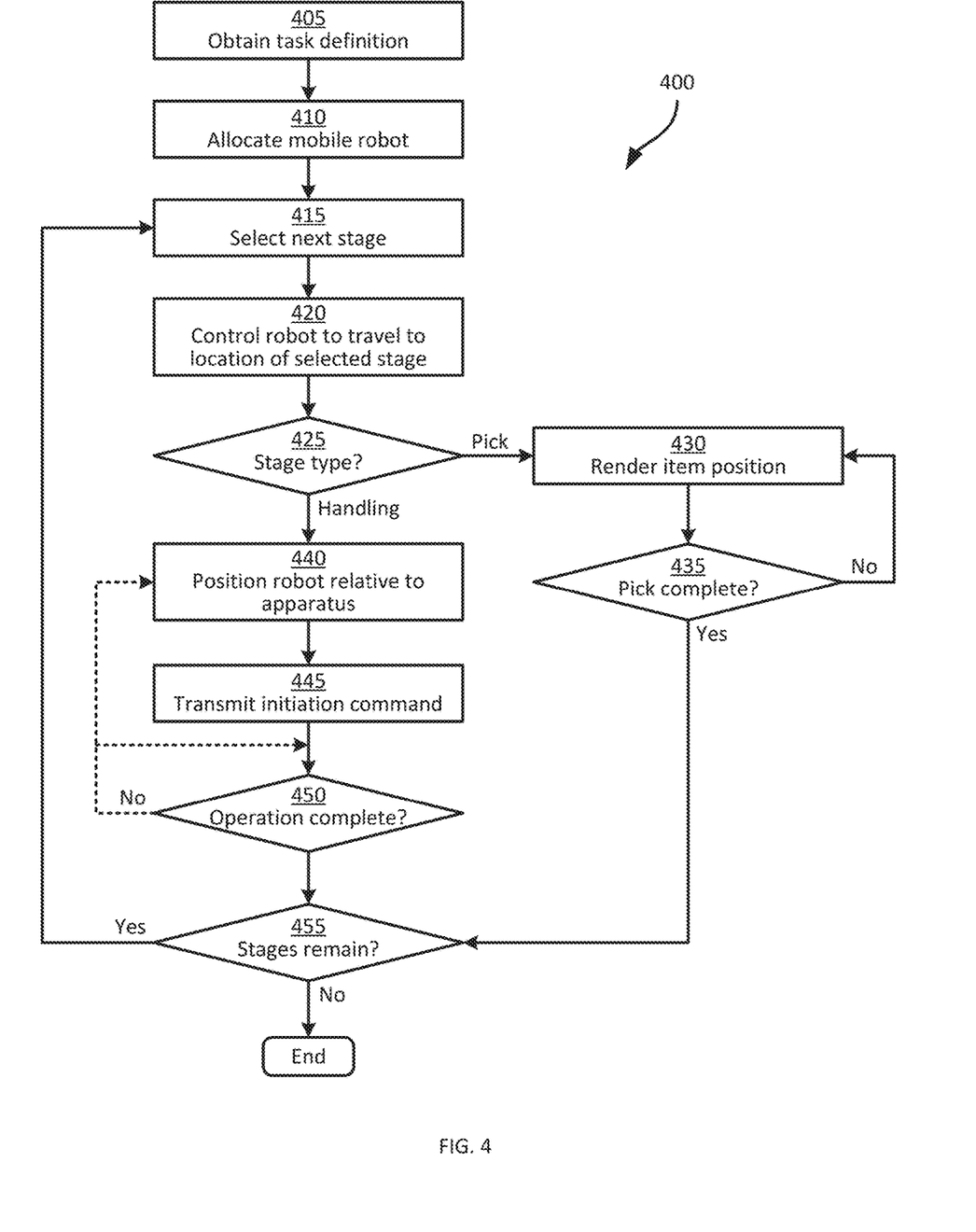
FIG. 4 is a flowchart illustrating a method of unit load fulfillment.

Turning to FIG. 4, a method 400 of automated unit load fulfillment is illustrated. The performance of the method 400 will be described below in conjunction with its performance in the facility 100, e.g. by the mobile robot 116 and the server 128. That is, certain blocks of the method 400 are described below as being performed by the server 128, while other blocks are described as being performed by the mobile robot 116. As will be apparent to those skilled in the art, in other implementations, blocks described as being performed by the mobile robot 116 can be performed by the server 128, and vice versa, e.g., dependent on the computational resources available to the mobile robot 116 and/or the server 128.

At block 405, the server 128 is configured to obtain a task definition. The task definition includes data defining a unit load order, and data used by the server 128 and the mobile robot 116 to fulfill the unit load order. The task definition therefore includes an identifier of the item(s) included in the unit load order. Because items in a unit load order are placed on an item support such as a pallet, the task definition also includes a position on the item support for each item in the unit load order. Further, the task definition includes an identifier of a unit load handling operation, to be applied to the unit load as a whole. As will be apparent, the task definition can include a plurality of item identifiers and corresponding positions, and can also include a plurality of handling operation identifiers, depending on the nature of the particular unit load order.

The task definition can be obtained at block 405 by automatic generation at the server 128. For example, the server 128 can receive a unit load order containing one or more item identifiers. The server 128 can then retrieve locations and physical attributes for the relevant items 104 from the repository 132, and generate the above-mentioned positions. Generation of the positions can be performed according to any of a variety of processes. For example, the server 128 can select the largest and/or heaviest of the items 104 in the unit load order, and select a position for that item 104 directly on the item support. The server 128 can then repeat the above process with the remainder of the items 104 in the order, until all items have been allocated positions, either directly on the item support, or on top of other items. The positions associated with each item 104 may therefore be defined as three-dimensional coordinates (e.g., bounding boxes) relative to the item support.

Based on the item locations in the facility 100, and the positions on the item support mentioned above, the server 128 can then generate a sequence of stages for the task definition. Each stage defines either the receipt of one or more items 104, or the performance of a unit load handling operation, such as the receipt of an item support on the mobile robot 116, the wrapping of a unit load at the wrapper 120, or the like. Each stage therefore includes a location (where the relevant item(s) 104 are to be received, or where the handling operation is to be performed), as well as data identifying the nature of the stage, e.g., a handling operation identifier, or an item identifier and quantity, where relevant.

In other embodiments, the server 128 itself need not generate the task definition. Instead, the task definition can be generate elsewhere, and the server 128 can obtain the task definition at block 405 by receiving the task definition from another computing device. In further examples, the task definition can be received at the server 128 as input data, e.g., from an operator of the server 128.

Figure 5:
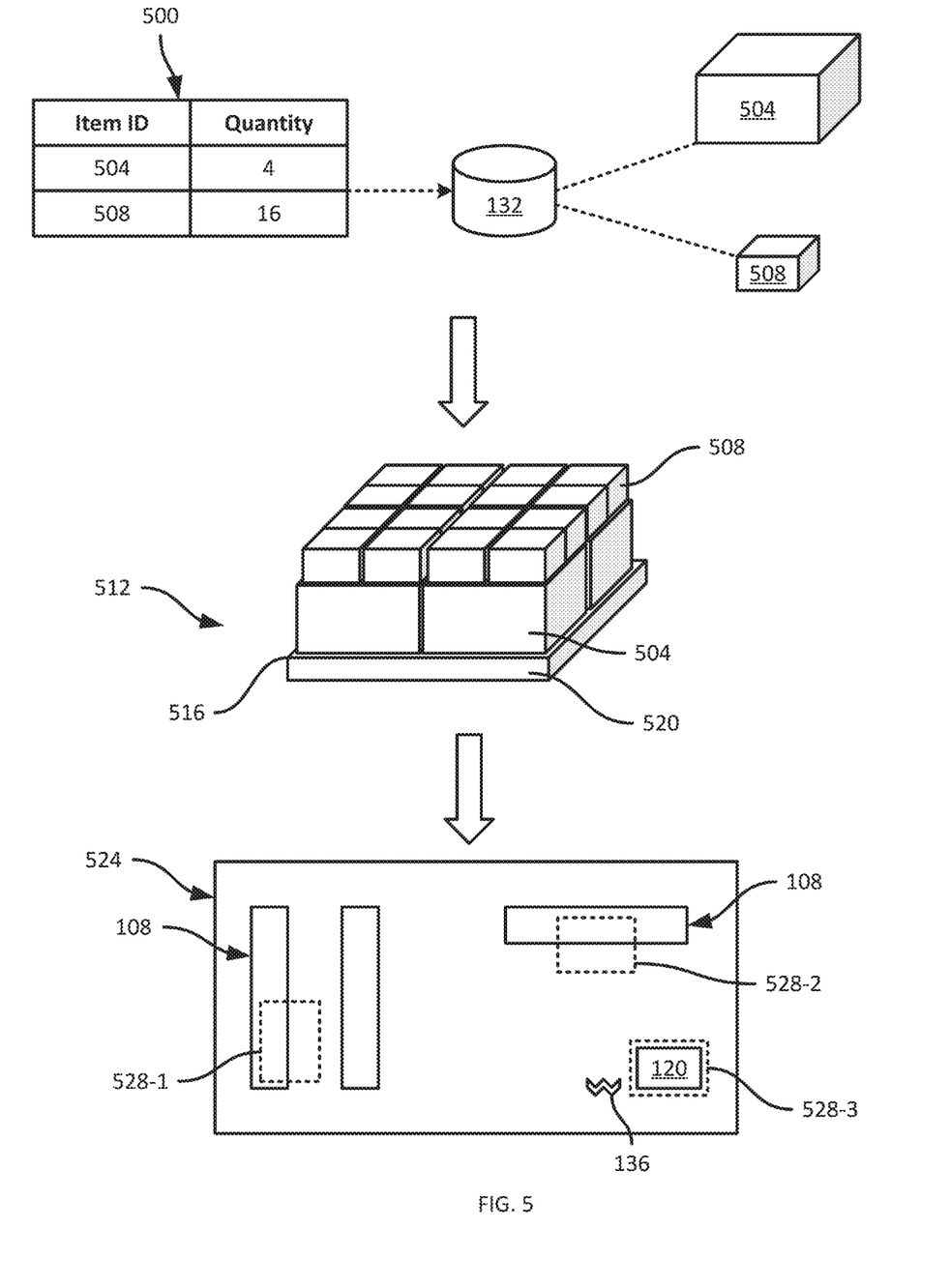
FIG. 5 is a diagram illustrating generation of a task definition at block 405 of the method of FIG. 4.

FIG. 5 illustrates the generation of a task definition schematically. For example, an order 500 can be received at the server 128, specifying a unit load consisting of four of a first item type (with the item identifier "504"), and sixteen of a second item type (with the identifier "508"). The item identifiers need not be in the format shown in FIG. 5, but can include Universal Product Codes (UPCs) or any other suitable identifier to distinguish items 104 from one another.

The server 128 can be configured to retrieve item attributes from the repository 132, based on the item identifiers. For instance, as shown in FIG. 5 the item 504 is larger than the item 508. Based on the item attributes mentioned above, the server 128 can be configured to generate an item support layout 512 specifying positions for each of the items in the unit load order 500. The layout 512, in other words, defines respective positions for each of the four instances of the item 504, and for each of the sixteen instances of the item 508. Each item position can be defined, for example, relative to an origin 516 on an item support 520 such as a pallet. In the illustrated example, the origin 516 is a corner of an upper surface of the item support 520, but various other origins may also be employed.

The server 128 can then generate a sequence of stages for the task definition based on the layout 512 and the locations of the items 504 and 508. For example, the lower portion of FIG. 5 illustrates an overhead view 524 of the facility 100. In this example, the sequence includes three stages. A first stage has a location 528-1, corresponding to the item 504. The first stage can therefore be defined by the location 528-1 (e.g., in a coordinate system previously established in the facility 100), the item identifier of the item 504, the quantity of the item 504 from the order 500, and the positions of each instance of the item 504 from the layout 512.

A second stage (i.e., to be executed following execution of the first stage) has a location 528-2, corresponding to the storage location of the item 508. As will be apparent, the locations 528-1 and 528-2 can be specified in the repository 132 in association with the items 504 and 508. The second stage can therefore be defined by the location 528-2, as well as the item identifier 508 and the quantity (e.g., sixteen in this case) of the item 508 from the order 500.

In the illustrated example, the sequence also includes a third stage (i.e., to be executed following execution of the second stage), corresponding to a location 528-3 of the wrapper 120. The third stage can be defined by the location 528-3 itself, and can include an identifier of a wrapping handling operation. The third stage can also be defined by alignment data for positioning the mobile robot 116 relative to the wrapper 120, as will be discussed below.

For simplicity, the sequence described above assumes that the mobile robot 116 is provided with a pallet or other item support 520 before execution of the task definition begins. In other examples, however, the task definition can begin with a handling operation selected to guide the mobile robot 116 to an apparatus such as a pallet lift, prior to travelling to the first location 528-1.

Returning to FIG. 4, at block 410, the server 128 is configured to allocate a mobile robot 116 to the task definition obtained at block 405. As will be apparent to those skilled in the art, the facility 100 can include a plurality of mobile robots 116, e.g., with previously defined unique identifiers. A specific mobile robot 116 can be allocated at block 410 based on the current locations of the mobile robots 116 in the facility, and/or the current status of the mobile robots 116 (e.g., whether each mobile robot has already been assigned a task definition).

Following allocation of a mobile robot 116, at block 415 the server 128 or the robot 116 can be configured to select the next stage (i.e., the earliest uncompleted stage in the task definition). In some examples, the server 128 can transmit the entire task definition to the selected robot 116 from block 410. The robot 116 can then select the next stage, and maintain status indicators for each stage during execution of the task definition (e.g., defining whether each stage has been completed or is in progress). In other examples, the server 128 can select and transmit each stage independently to the robot 116. In any event, at block 415, in this example performance of the method 400, the first stage is selected and transmitted from the server 128 to the robot 116 (if not previously transmitted).

At block 420, the robot 116 is controlled to travel to the location of the stage selected at block 415. Thus, in this example, the robot 116 is controlled to travel to the location 528-1 associated with the first stage of the task definition shown in FIG. 5. Control of the robot 116 at block 420 is performed by the processor 212, via execution of the application 222. The processor 212 can implement any suitable navigational process to monitor a current location of the robot 116, plan a path to the location 528-1, and control the locomotive assembly to travel to the location 528-1, e.g., while employing the sensor 224 to monitor the current location, the presence and/or positions of obstacles, and the like. In other examples, block 420 can be performed by, or assisted by, the server 128 rather than being performed solely at the robot 116.

At block 425, in response to arrival of the robot 116 at the location associated with the selected stage, the robot 116 is configured to proceed according to the type of the selected stage. In particular, when the selected stage is a pick stage at which one or more items 104 are to be placed on the item support carried by the robot 116, the performance of the method 400 proceeds to block 430. As will now be apparent, the first stage of the example task definition discussed in connection with FIG. 5 is a pick stage.

At block 430, either or both of the robot 116 and the server 128 are configured to control an output device to render a position on the item support 520 at which an item 104 is to be placed. The position, as will now be apparent, corresponds to the position determined for that item 104 in the layout 512. The output device controlled at block 430 can be one or more of a plurality of output devices. For example, turning to FIG. 6, the robot 116 is shown with an item support 520 on the platform 208, with no items 104 yet placed thereon. The layout 512 is also shown, with a first item 504 highlighted as corresponding to the first stage of the above-mentioned sequence. At block 430, the processor 212 can control the indicator lights 228b to illuminate, flash, or the like, at positions corresponding to the position for the first item 504 in the layout 512. That is, a segment 600 of each strip of indicator lights 228b with a length selected according to the layout 512 can be illuminated, to indicate to a worker 112 where to place the first item 504.

Figure 6:
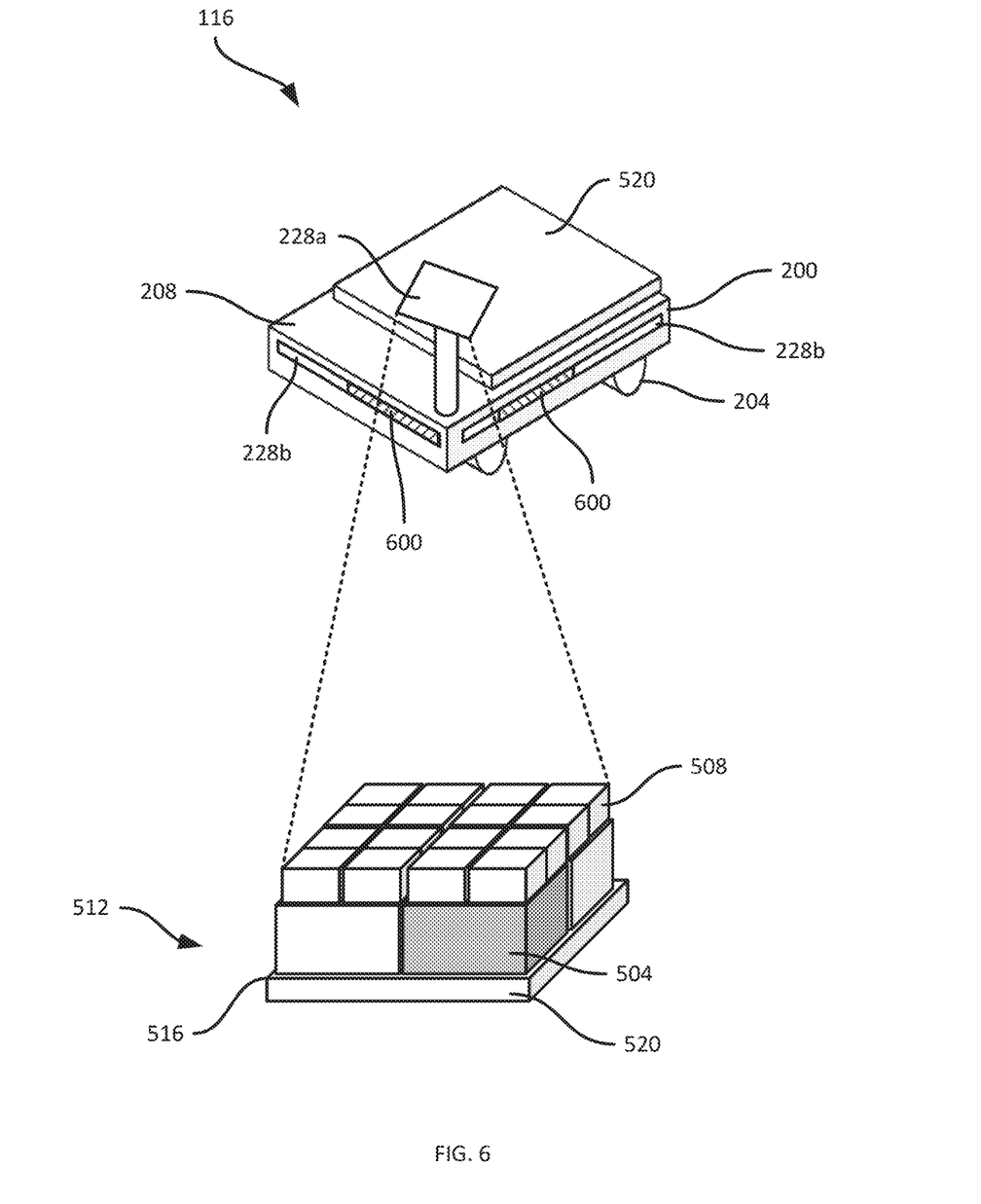
FIG. 6 is a diagram illustrating an example performance of block 430 of the method of FIG. 4.

In other examples, block 430 can include controlling the display 228a to present an image of the layout 512, e.g., in its entirety, with the first item 504 highlighted as in the lower portion of FIG. 6. In further examples, the server 128 can also transmit an image, such as the above-mentioned image of the layout 512, to the client device 140 for presentation to the worker 112 via a display of the client device 140.

The rendering of an item position at block 430 can also include presenting an item identifier, enabling the worker 112 to locate the correct item type on the support structures 108. For example, the display 228a can present the item identifier, and/or an image, product name, or the like, of the item 504.

At block 435, the robot 116 and/or the server 128 are configured to determine whether the pick stage is complete. When the determination is negative, the rendering of item positions continues at block 430. As will be apparent, the first stage of the example layout includes the receipt of four instance of items 504, at the location 528-1. Therefore, the determination at block 435 may be negative until all four instances have been placed. Further, following each placement of an item 504 on the item support 520, the item position rendered via the indicator lights 228b and/or display 228a can be updated to present the next item position for the current stage.

The determination at block 435 can be made, for example, based on input received at either or both of the robot 116 and the server 128. For example, having placed an item 504 on the item support 520, the worker 112 can activate a selectable option on the display 228a indicating that an item has been placed. In other examples, the worker 112 can scan the placed item 504 (e.g., to capture a barcode or other indicium on the item 504), using the client device 140 or a scanner integrated with the robot 116. The output of such a scan can be provided to the server 128, which can then transmit a signal to the robot 116 to begin rendering the position of the next item, or to proceed to block 455 if no items remain for the current stage. In other examples, the robot 116 can include sensors to automatically detect the presence of items 104, such as RFID sensors, load sensors in the platform 208, and the like.

When the determination at block 435 is affirmative, performance of the method 400 proceeds to block 455. At block 455, if further stages remain in the task definition, the performance of the method 400 returns to block 415. Otherwise, the performance of the method 400 ends. The determination at block 455 can be performed by the robot 116 (e.g., if the robot 116 is provided with the entire task definition at block 410), or by the server 128.

In the present example, following completion of the first stage, four items 504 are placed on the item support 520, and two stages remain. The determination at block 455 is therefore affirmative, and the next stage is selected at block 415.

In the present example performance of the method 400, at block 415 the second stage of the task definition, corresponding to the location 128-2, is selected. As set out above, therefore, at block 420 the robot navigates (or alternatively is controlled by the server 128 to travel) to the second location 528-2. The second stage in this example, like the first stage, is a pick stage and performance of the method 400 therefore proceeds from block 425 to block 430, as described above.

Figure 7:
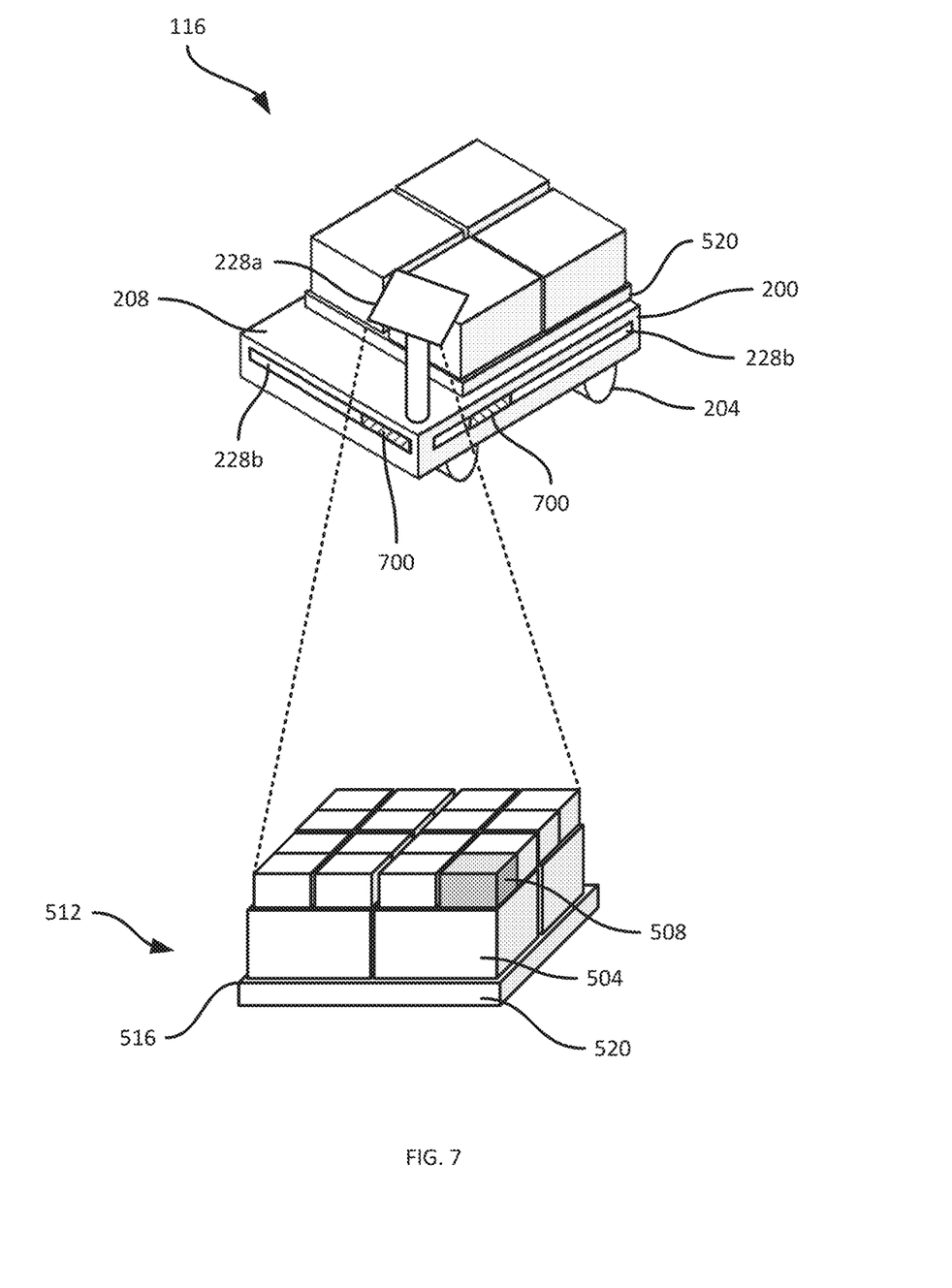
FIG. 7 is a diagram illustrating a further example performance of block 430 of the method of FIG. 4.

At block 430, as shown in FIG. 7, the robot 116 can be configured to render an indication of the position at which the next item is to be placed on the item support. In the illustrated example, the four items 504 have been placed on the item support, and the position rendered at block 430 is for placement of the first of sixteen items 508. As described earlier, the indicator light strips 228b are controlled to illuminate (and/or flash, illuminate in a different color from the remainder of the strip, etc.) segments 700 with lengths corresponding to the dimensions of the items 508. Further, an image of the layout 512, e.g., with the relevant item 508 highlighted as shown in the lower portion of FIG. 7, can be presented on the display 228a, the client device 140, or both. The performance of blocks 430 and 435 is repeated until each of the sixteen items 508 have been placed on the item support 520 (i.e., on top of the items 504 in the present example, which are in turn on the item support 520), following which further affirmative determinations at blocks 435 and 455 lead to a further performance of block 415.

The third performance of block 415, in this example, involves selecting the third stage of the sequence, corresponding to the third location 528-3 (that is the location of the apparatus 120). At block 420, the robot 116 is controlled to travel to the location 528-3, and from block 425, performance of the method 400 proceeds to block 440 rather than block 430, as the third stage of the sequence defines a handling operation rather than a pick.

At block 440, the processor 212 is configured to position the robot 116 relative to the apparatus 120. In particular, the processor 212 is configured to collect sensor data from the sensor(s) 224 and detect the marker 136 in the sensor data. For example, the sensor data can include a point cloud depicting at least a portion of the physical surroundings of the robot 116, and the processor 212 can search the point cloud for predefined features (e.g., stored in the memory 216) corresponding to the marker 136. The marker 136 is therefore designed to be robustly identifiable in a variety of environments. The marker 136 can include a set of readily identifiable edges, reflective surfaces, and the like, to facilitate identification in captured point cloud data. The marker 136 can be specific to the apparatus 120 in some examples, although in some embodiments it is contemplated that distinct instances of the same marker 136 (i.e., having the same physical features as one another) can be disposed in association with a plurality of apparatuses, such as the wrapper 120, a pallet lifter, a scale, and the like.

The markers 136 enable interactions between the robot 116 and various handling apparatus, even when a single marker type is employed, in conjunction with the previously mentioned alignment data stored in the repository 132. Specifically, at block 440, having detected the marker 136, the robot 116 is configured to obtain the alignment data corresponding to the apparatus 120. The alignment data can be included in the task definition previously received at the robot 116, or can be retrieved from the server 128 at block 440. In other examples, the alignment data can be encoded in the marker 136 itself, e.g., in the form of a QR code, RFID tag, or other machine-readable indicium. In further examples, the alignment data can be retrieved from the apparatus 120 itself, e.g. via a Bluetooth beacon affixed to or otherwise associated with the apparatus 120.

Figure 8:
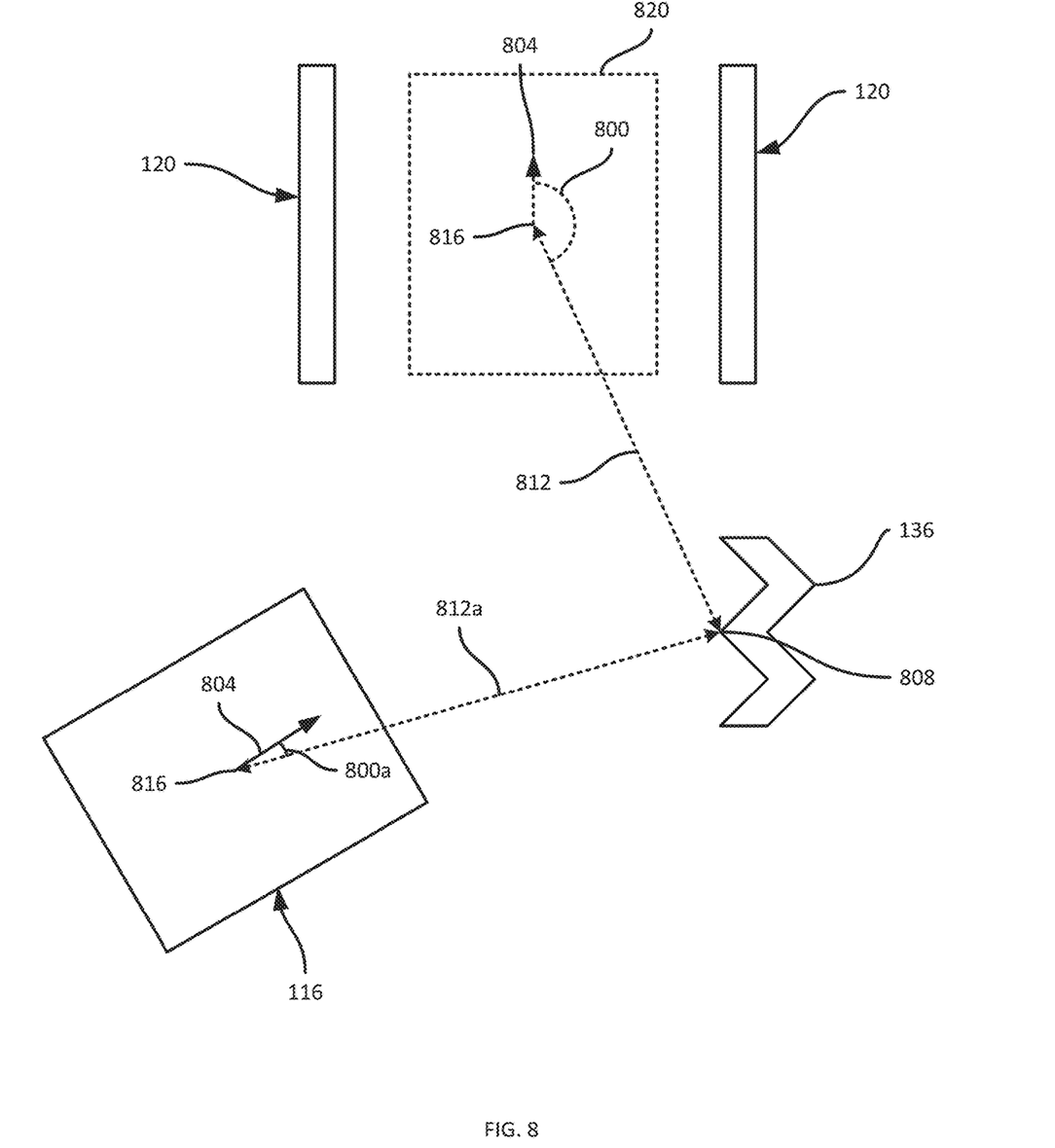
FIG. 8 is a diagram illustrating an example performance of block 440 of the method of FIG. 4.

Turning to FIG. 8, a partial overhead view of the apparatus 120 is shown, depicting the side walls of the apparatus 120 visible in FIG. 1. The alignment data obtained at block 440 defines a target pose of the robot 116 relative to the marker 136, attainment of which positions the robot 116 to interact with the apparatus 120. The marker 136 is therefore installed in a fixed position relative to the apparatus 120, whether directly on the apparatus 120 or (as illustrated) adjacent to the apparatus 120. In the present example, the alignment data includes a heading 800, e.g., defined as an angle relative to a forward direction 804 of the robot 116. The angle heading 800, in this example, is an angle between the forward direction 804 and a central peak 808 of the marker 136. The alignment data can also define a distance 812 from a centroid 816 of the robot 116 (or any other suitable reference point of the robot 116) to the central peak 808, in a direction defined by the heading 800.

To position the robot 116 relative to the apparatus 120 (i.e., in the target position 820 shown in dashed lines between the side walls of the apparatus 120), the processor 212 is configured to detect the marker 136 via sensor data, and determine a current heading 800a and a current distance 812a. When the current heading 800a and distance 812a do not match the target heading 800 and distance 812, the processor 212 is configured to control the locomotive assembly 204 to adjust the position of the robot 116, and repeat the above process, until the current heading 800a and distance 812a substantially match the alignment data (e.g., fall within a predefined threshold of the target heading 800 and distance 812).

As will now be apparent, therefore, markers 136 deployed in association with various apparatuses in the facility 100, in combination with respective alignment data for each apparatus, enable the robot 116 to position itself relative to various apparatus within the facility 100, each of which may have distinct positioning requirements. In some examples, more than one marker 136 can be deployed for a given apparatus, and the alignment data can include target headings and distances for each marker 136. In such examples, the processor 212 adjusts the position of the robot 116 until each target heading and distance is satisfied (i.e., simultaneously).

At block 445, when the robot 116 is positioned relative to the apparatus 120, the robot 116 transmits an initiation command to the apparatus 120. In the present example, the robot 116 transmits the initiation command via the server 128. That is, the processor 212 can be configured to transmit a message to the server 128 indicating that the robot 116 is at the target position. The server 128, in turn, is configured to transmit the initiation command to the apparatus 120. In facilities 100 with a plurality of apparatus of the same type (e.g., a plurality of wrappers), the server 128 can determine which apparatus to communicate with based on a current location of the robot 116, and/or an apparatus identifier obtained by the robot 116 (e.g., from the above-mentioned beacon, or any suitable machine-readable indicium associated with the apparatus) and transmitted to the server 128.

In further examples, the alignment data can also specify behavior beyond a static position of the robot 116 relative to the corresponding apparatus. For example, for a scanning and/or weighing station, the alignment data may position the robot 116 at a first pose relative to the apparatus, and also specify a travel speed and direction once positioned. Thus, the robot 116 is configured to arrive at the target position, and begin travelling in the specified direction (e.g., at a specified speed) once the initiation command has been sent. A wide variety of other behaviors can also be specified in the alignment data, as will now be apparent. For example, some robots 116 can be equipped with rotating platforms, and the alignment data can specify that following positioning of the robot, the platform is to be controlled to rotate at a defined speed.

At block 450, the robot 116 and/or the server 128 are configured to determine whether the handling operation is complete. For example, in embodiments in which the initiation command is transmitted via the server 128, the server 128 can receive a further message from the apparatus 120 indicating that the operation (e.g., wrapping of the unit load in this example) is complete. The server 128 can then transmit a message to the robot 116 indicating that the operation is complete. In other examples, the robot 116 and the apparatus 120 can communicate directly, and the above message can be transmitted directly from the apparatus 120 to the robot 116 (either of which may also relay the message to the server 128). In further examples, the robot 116 can start a timer at block 445, and determine that the operation is complete at block 450 upon expiry of the timer.

When the determination at block 450 is negative, performance of the method 400 can return to block 440, according to the alignment data, or can simply repeat the performance of block 450. For example, the alignment data may specify a multi-step interaction with the apparatus 120, each of which is defined by specific alignment data. The robot 116 may therefore reposition itself upon completion of a step, and generate a further initiation command to initiate the next step in the operation.

Following an affirmative determination at block 450, the robot 116 and/or the server 128 are configured to determine whether any stages remain in the task definition at block 455. As noted above, when the determination at block 455 is affirmative, performance of the method 400 returns to block 415. Otherwise, performance of the method 400 ends.

As will now be apparent, a wide variety of stages can be defined by a task definition and executed via performance of the method 400, to automate various portions of a unit load order fulfillment. For example, a task definition can include an initial handling operation to place (e.g., via an automatic pallet lifter) an item support on the platform 208, followed by a series of pick stages, followed by a wrapping stage, and finally a unit load removal stage, in which an automated apparatus such as a forklift or a static lifter are controlled to remove the completed unit load from the platform 208 for shipping.

Variations to the above systems and methods are contemplated. For example, various portions of a task definition can be updated, e.g. by the server 128, during execution of the task definition via the method 400. For example, the server 128 can implement exception handling functionality, e.g., to replace a location for a pick stage with a further location, if a required item is out of stock at the originally specified location. In other examples, the server 128 can update either or both of the layout 512 and the stage locations following such an exception.

In some examples, the task definition itself need not specify locations 528. Instead, for example, the task definition can include item identifiers and handling operation identifiers, and at runtime, the server 128 can identify specific locations, e.g. based on current stock levels, availability of handling equipment, and the like.

In further examples, the robot 116 can be configured to collect sensor data during travel between locations, and/or at pick locations, in addition to at handling locations. The processor 212 can be configured to identify other robots 116 in such sensor data, and to evaluate various criteria, such as load stability, corresponding to unit loads carried by those robots 116. For example, the processor 212 can be configured to detect a unit load on a platform 208 of another robot 116, and identify a visual center of mass of the unit load. Based on the center of mass, the processor 212 can determine whether the unit load is leaning or otherwise unstable, and can transmit a message to the server 128 indicating an identifier or the other robot (e.g., obtained from the sensor data) and an error indicator. The server 128 may respond by, for example, updating the task definition currently under execution by the other robot 116, e.g., to insert an inspection stage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method, comprising:
obtaining a task definition for a mobile robot, the task definition including (i) a position on an item support carried by the mobile robot, and (ii) an identifier of an item to be placed at the position to form a unit load with the item support;
controlling the mobile robot carrying the item support to travel to a pick location for receiving the item from a picker;
controlling an output device to render an indication of the position for the picker at the pick location; and
responsive to placement of the item at the position by the picker, controlling the mobile robot to travel to a handling location;
wherein the mobile robot includes a platform for carrying the item support, and light emitters adjacent to the platform; and wherein controlling the output device includes activating a segment of the light emitters corresponding to the position on the item platform.

2. The method of claim 1, wherein the task definition further includes the handling location in association with the unit load handling operation identifier.

3. The method of claim 1, wherein the mobile robot includes a chassis supporting a display; and wherein controlling the output device includes controlling the display to render an image indicating the position.

4. The method of claim 1, wherein controlling the output device includes transmitting the position to a client computing device for display by the client computing device.

5. The method of claim 4, wherein the client computing device includes at least one of: a mobile computer, and a heads-up display.

6. The method of claim 1, further comprising:
responsive to arrival of the mobile robot at the handling location, initiating a handling operation associated with the handling location.

7. A system, comprising:
a mobile robot having a platform for carrying an item support; and
a task controller, configured to:
obtain a task definition including (i) a position on an item support, (ii) an identifier of an item to be placed at the position to form a unit load with the item support, and (iii) an identifier of a unit load handling operation;
control the mobile robot carrying the item support to travel to a pick location for receiving the item;
control an output device associated with the pick location to render an indication of the position;
responsive to placement of the item at the position, control the mobile robot to travel to a handling location associated with the unit load handling operation; and
responsive to arrival of the mobile robot at the handling location, automatically position the mobile robot relative to an apparatus at the handling location;
wherein the mobile robot comprises light emitters adjacent to the platform; and
wherein the task controller is further configured to control the output device to activate a segment of the light emitters corresponding to the position.

8. The system of claim 7, wherein the task controller is further configured to:
responsive to automatically positioning the mobile robot, transmit a command to the apparatus to initiate the unit load handling operation.

9. The system of claim 7, wherein the task definition further includes the handling location in association with the unit load handling operation identifier.

10. The system of claim 7, wherein the task controller is further configured to:
responsive to placement of the item at the position, select the handling location according to the unit load handling operation identifier.

11. The system of claim 7, wherein the task definition defines a sequence of stages including:
(i) a pick stage containing the position and the item identifier,
(ii) a handling stage containing the unit load handling operation identifier, and
(iii) a further handling stage; and wherein the task controller is further configured to detect a completion of the unit load handling operation, and initiate execution of the further handling stage.

12. The system of claim 11, wherein the task controller is further configured, to detect completion of the unit load handling operation, to detect at least one of: expiry of a timer, and receipt of a completion signal from the apparatus.

13. The system of claim 7, wherein the mobile robot includes a display; and
wherein the task controller is further configured, to control the output device, to control the display to render an image indicating the position.

14. The system of claim 7, further comprising a client device;
wherein the task controller is further configured, to control the output device, to transmit the position to the client computing device for display by the client computing device.

15. The system of claim 14, wherein the client computing device includes at least one of: a mobile computer, and a heads-up display.

16. The system of claim 7, wherein the mobile robot includes a sensor; and
wherein the task controller is further configured, to automatically position the mobile robot, to:
detect, via the sensor, a guide feature associated with the apparatus;
obtain configuration data for the apparatus, defining a position of the robot relative to the marker; and
position the mobile robot relative to the marker according to the configuration data.

17. The system of claim 15, wherein the task controller is further configured to:
store a repository of apparatus identifiers and corresponding unit load handling operation identifiers and configuration data;
obtain the configuration data by retrieving the configuration data from the repository according to the unit load handling operation identifier.

18. The system of claim 16, wherein the guide feature includes a marker disposed at the handling location.

19. A method, comprising:
obtaining a task definition for a mobile robot having a sensor, the task definition including (i) an identifier of an item to be placed on an item support carried by the mobile robot, to form a unit load with the item support, and (ii) an identifier of a unit load handling operation to be applied to the unit load;
responsive to placement of the identified item on the item support by a picker, controlling the mobile robot to travel to a handling location corresponding to the unit load handling operation;
responsive to arrival of the mobile robot at the handling location, capturing sensor data via the sensor of the mobile robot; and
based on the sensor data and the identifier of the unit load handling operation, automatically positioning the mobile robot relative to an apparatus at the handling location;
wherein automatically positioning the mobile robot includes:
detecting, in the sensor data, a guide feature associated with the apparatus;
obtaining configuration data for the apparatus, defining a position of the robot relative to the guide feature; and positioning the mobile robot relative to the guide feature according to the configuration data;

wherein the guide feature includes a marker disposed at the handling location.

20. The method of claim 19, further comprising:

responsive to automatically positioning the mobile robot, transmitting a command to the apparatus to initiate the unit load handling operation.

21. The method of claim 19, further comprising:

responsive to placement of the item on the item support, selecting the handling location according to the unit load handling operation identifier.

22. The method of claim 19, wherein the task definition defines a sequence of stages including:

(i) a pick stage containing the item identifier, (ii) a handling stage containing the unit load handling operation identifier, and (iii) a further handling stage; and wherein the method further comprises detecting a completion of the unit load handling operation, and initiating execution of the further handling stage.

23. The method of claim 22, wherein detecting completion of the unit load handling operation includes at least one of: expiry of a timer, and receipt of a completion signal from the apparatus.

24. The method of claim 19, further comprising:

storing a repository of apparatus identifiers and corresponding unit load handling operation identifiers and configuration data;

wherein obtaining the configuration data includes retrieving the configuration data from the repository according to the unit load handling operation identifier.

* * * * *